(12) United States Patent
Wipasuramonton et al.

(10) Patent No.: US 9,718,429 B2
(45) Date of Patent: Aug. 1, 2017

(54) SIDE AIRBAG MODULE AND ASSEMBLY

(71) Applicant: TK HOLDINGS INC., Auburn Hills, MI (US)

(72) Inventors: Pongdet Paul Wipasuramonton, Rochester, MI (US); Jonathan Richard Kibat, Warren, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/788,126

(22) Filed: Jun. 30, 2015

(65) Prior Publication Data

US 2016/0009239 A1 Jan. 14, 2016

Related U.S. Application Data

(60) Provisional application No. 62/019,733, filed on Jul. 1, 2014.

(51) Int. Cl.
*B60R 21/207* (2006.01)
*B60R 21/215* (2011.01)

(52) U.S. Cl.
CPC .......... *B60R 21/207* (2013.01); *B60R 21/215* (2013.01)

(58) Field of Classification Search
CPC .................................................... B60R 21/207
See application file for complete search history.

(56) References Cited

U.S. PATENT DOCUMENTS

| | | | |
|---|---|---|---|
| 5,826,938 A * | 10/1998 | Yanase .................. | B60R 21/207 280/728.3 |
| 6,050,636 A * | 4/2000 | Chevallier ........... | B60N 2/5825 280/728.1 |
| 6,155,593 A * | 12/2000 | Kimura ................. | B60R 21/207 280/728.2 |
| 7,350,803 B2 * | 4/2008 | Abramczyk .......... | B60R 21/207 280/730.2 |
| 8,075,053 B2 * | 12/2011 | Tracht .................. | B60N 2/5841 280/730.2 |
| 8,123,246 B2 * | 2/2012 | Gilbert ................. | B60R 21/207 280/728.2 |
| 8,727,374 B1 * | 5/2014 | Line ...................... | B60R 21/207 280/728.3 |

(Continued)

FOREIGN PATENT DOCUMENTS

| DE | GB 2305638 A * | 4/1997 | ........... B60R 21/207 |
|---|---|---|---|
| DE | EP 1199227 A1 * | 4/2002 | ........... B60R 21/207 |

(Continued)

OTHER PUBLICATIONS

International Search Report and Written Opinion for PCT/US2015/038625; mailed Oct. 8, 2015; 14 pages.

*Primary Examiner* — Ruth Ilan
(74) *Attorney, Agent, or Firm* — Gordon & Rees LLP

(57) ABSTRACT

A side airbag assembly for protecting an occupant of a vehicle seat. The assembly includes an inflatable cushion, wherein the cushion is stored in a compact arrangement. An inflator is provided for supplying inflation gas for the cushion. The inflator and cushion are secured in position by a mounting bracket connected to a frame of the vehicle seat. A cover for covering a back surface of the vehicle seat is included and the cover includes a rear facing surface and a first side facing surface. The cover is connected to the mounting bracket.

14 Claims, 3 Drawing Sheets

(56) References Cited

U.S. PATENT DOCUMENTS

| | | | |
|---|---|---|---|
| 8,905,431 B1 * | 12/2014 | Line | B60R 21/215 |
| | | | 280/728.2 |
| 9,302,643 B2 * | 4/2016 | Line | B60N 2/58 |
| 2006/0012155 A1 | 1/2006 | Shaner et al. | |
| 2006/0113751 A1 * | 6/2006 | Tracht | B60N 2/5825 |
| | | | 280/728.2 |
| 2006/0113760 A1 * | 6/2006 | Tracht | B60R 21/207 |
| | | | 280/730.2 |
| 2007/0057493 A1 * | 3/2007 | Ritzel | B60N 2/58 |
| | | | 280/730.2 |
| 2012/0091695 A1 | 4/2012 | Richez et al. | |
| 2012/0091766 A1 | 4/2012 | Yamaki et al. | |
| 2013/0119646 A1 * | 5/2013 | Tracht | B60R 21/207 |
| | | | 280/730.1 |
| 2014/0008898 A1 | 1/2014 | Tracht | |
| 2015/0360636 A1 * | 12/2015 | Kaneko | B60N 2/449 |
| | | | 280/730.2 |

FOREIGN PATENT DOCUMENTS

| | | | |
|---|---|---|---|
| DE | 102006014381 A1 * | 10/2007 | |
| SE | DE 102006014381 B4 * | 9/2010 | B60R 21/207 |

\* cited by examiner

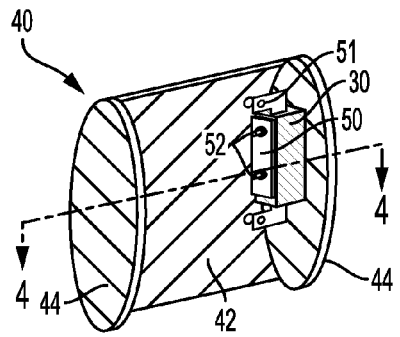
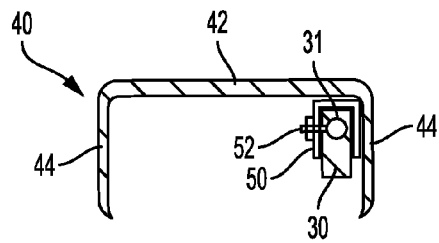
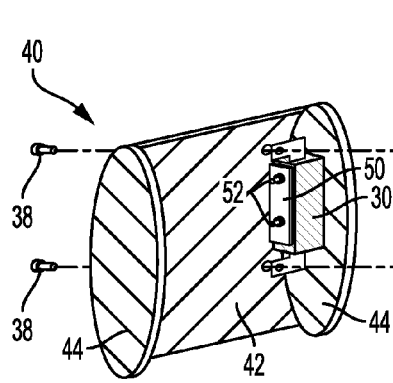
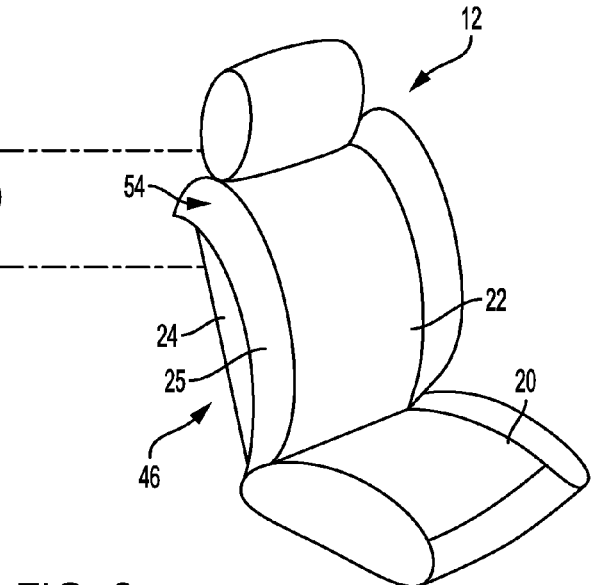
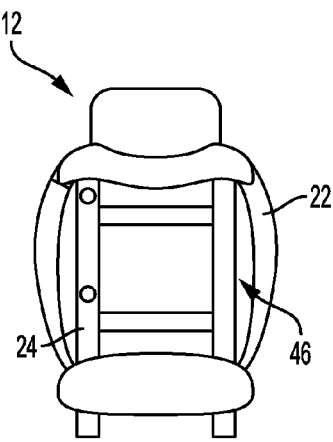
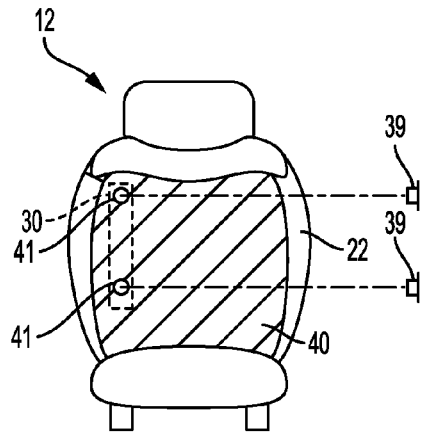
FIG. 3
FIG. 4
FIG. 2
FIG. 5
FIG. 6

SIDE AIRBAG MODULE AND ASSEMBLY

CROSS REFERENCE TO RELATED APPLICATIONS

The present application claims priority to and the benefit of U.S. Provisional Patent Application No. 62/019,733, filed Jul. 1, 2014. The foregoing provisional application is incorporated by reference herein in its entirety.

BACKGROUND

The present application relates generally to the field of airbag modules. More specifically, the present application relates to an apparatus for mounting a side impact airbag (SAB) module to a seat frame.

Typically, side airbag (SAB) modules are mounted to a seat frame by bolting the module to the seat frame within a deployment chute or intensifier panel, which is attached to a seat cover seam and acts to direct the inflated airbag cushion through a seam of the seat cover upon deployment. Inserting a side airbag module into the pre-fabricated chute or pocket and then bolting to a seat frame is a tedious and difficult process. Not to mention the seat cover must then be pulled over the front and back of the seat foam. Moreover, the chute or pocket adds complexity to the seat cover sewing and must be done separately. Furthermore, deploying the SAB cushion through a seam in the seat cover limits the freedom of the OEM and/or the seat manufacturer to style the seat cover and foam cushion face.

SUMMARY

Disclosed herein is a side airbag assembly for protecting an occupant of a vehicle seat. The assembly includes a side airbag module including an inflatable cushion and an inflator for providing inflation gas for inflating the cushion. A mounting bracket is connected to the airbag module and to the vehicle seat. A back panel overlies a back surface of the vehicle seat and the airbag module. The back panel includes a rear facing surface and a side facing surface. The mounting bracket is connected to the back panel. The mounting bracket may be integrally formed with the cover such as over molding of a steel bracket to a plastic back panel. The back panel may include a second side facing surface that faces in an opposite direction to the side facing surface. The mounting bracket is connected to the back panel and preferably to the side facing surface. The cover is configured so that when the inflatable cushion inflates the first side facing surface flexes outwardly and could function as a deployment chute.

In another disclosed embodiment, the assembly includes an inflatable cushion stored in a compact arrangement. An inflator is provided for supplying inflation gas for the cushion. The inflator and cushion are secured in position by a mounting bracket connected to a frame of the vehicle seat. A back panel for covering a back surface of the vehicle seat is included and the back panel includes a rear facing surface and a first side facing surface. The cover is connected to the mounting bracket.

BRIEF DESCRIPTION OF THE DRAWINGS

Features, aspects and advantages of the present invention will become apparent from the following description and the accompanying exemplary embodiments shown in the drawings, which are briefly described below.

FIG. 2 is a schematic exploded perspective view of a vehicle seat, according to an exemplary embodiment.

FIG. 3 is a schematic perspective view of a back cover and SAB module for the vehicle seat of FIG. 2.

FIG. 4 is a schematic cross-section view of the back cover and SAB module of FIG. 3, taken along line 4-4.

FIG. 5 is a schematic rear view of the vehicle seat of FIG. 1 showing the back cover and SAB module removed.

FIG. 6 is a schematic rear view of the vehicle seat of FIG. 1 showing the back cover and SAB module coupled to the seat back frame.

DETAILED DESCRIPTION

Figure 1:
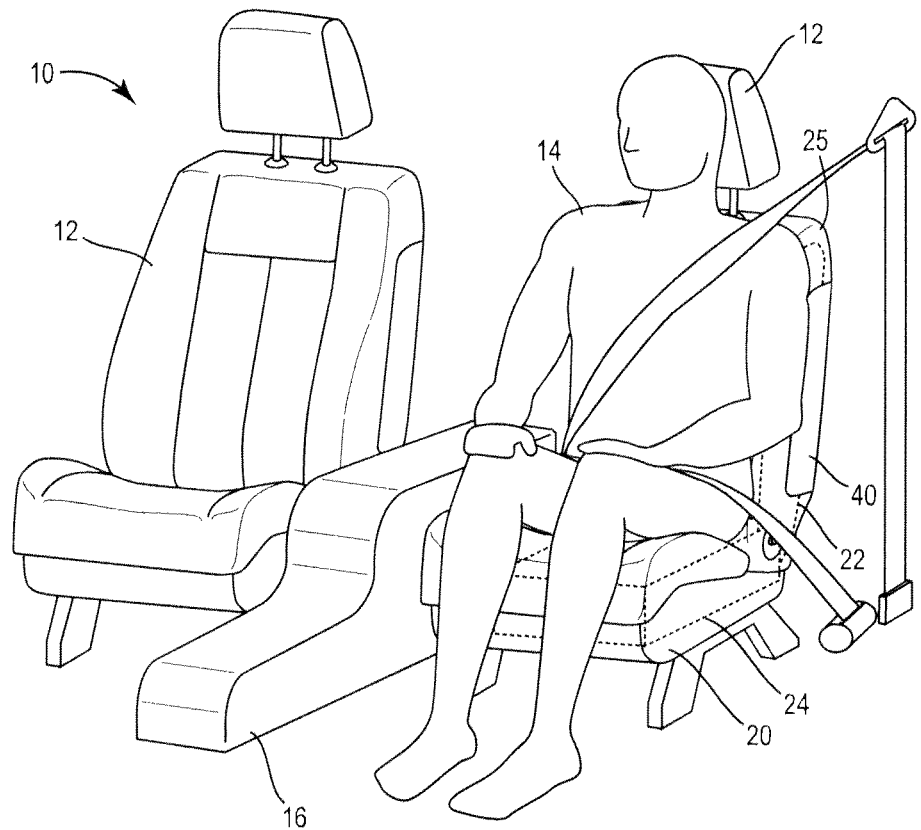
FIG. 1 is a schematic perspective view of a vehicle interior.
Figures 7, 8:
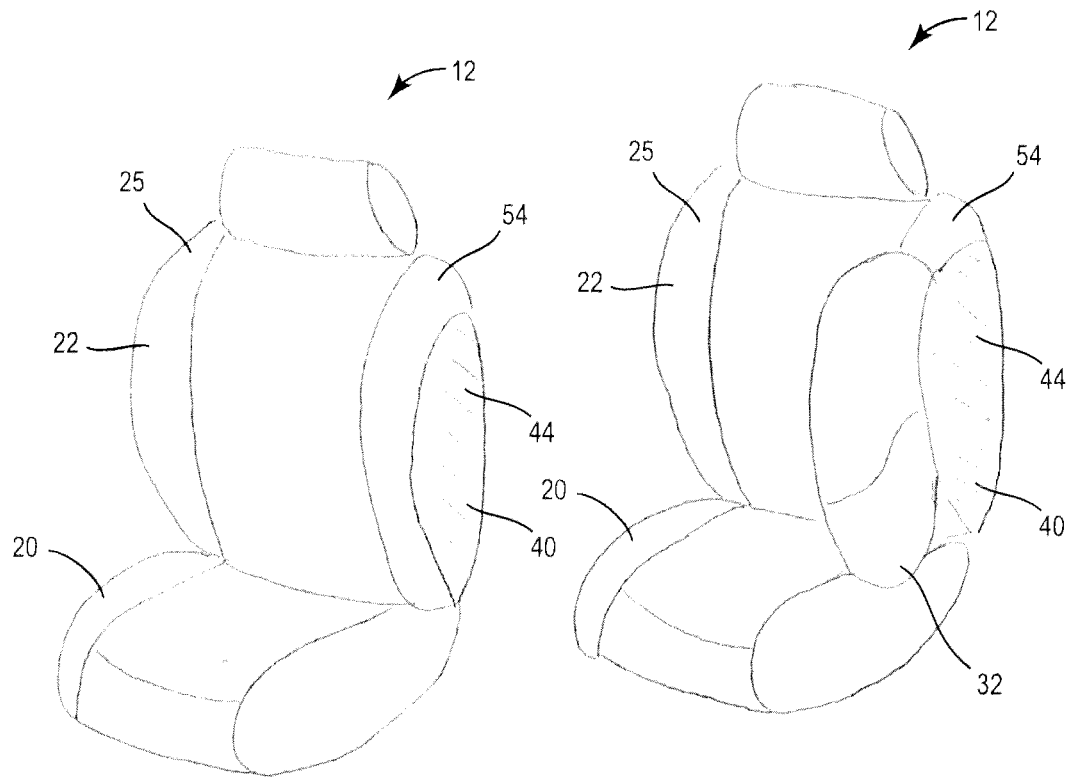
FIG. 7 is a schematic perspective view of the vehicle seat of FIG. 1.
FIG. 8 is a schematic perspective view of the vehicle seat of FIG. 1 with the SAB module deployed.

FIG. 1 depicts a vehicle interior 10 including a vehicle seat 12 configured to receive one or more occupants 14. One or more seats 12 may be provided in a row and may be separated by a structure, such as a center console 16. The center console 16 may in some embodiments include storage compartments, trim components, a gear shift, etc. The vehicle seat 12 includes a generally horizontal lower portion or seat bottom 20 that is coupled to the vehicle and an upper portion or seat back 22 that extends upward from the rear end of the seat bottom 20. The seat bottom 20 may be coupled to the vehicle with a mounting system that allows the vehicle seat 12 to be moved relative to the vehicle (e.g., fore/aft, lateral, up/down, etc.). The seat back 22 may be connected to the seat bottom 20 through a recliner mechanism that allows the seat back 22 to tilt or pivot relative to the seat bottom 20. Each of the seat bottom 20 and the seat back 22 include a supporting frame 24. A cushion such as a foam pad may be coupled to the frame 24 and a trim cover may surround the cushion.

Referring now to FIGS. 2-8, the seat 12 may be configured to include an airbag device, such as a SAB module 30. The SAB module 30 may be mounted to the seat back panel 44, under a seatback panel 40 that overlies the back of the seat back 22 (see FIGS. 2-4). The SAB module 30 includes an inflatable airbag cushion 32 (see FIG. 8) and a gas generator or inflator configured to generate a gas to inflate the airbag cushion. In a side impact, the airbag cushion 32 inflates and is extended forward of the seatback 22 of seat 12 to be positioned along the side of the of the occupant 14 of the vehicle seat 12 to limit the lateral (e.g., cross-car) movement of the occupant. The occupant load on the airbag cushion 32 is absorbed by the inflated cushion which is sandwiched between the oncoming door trim and the occupant body parts. The airbag deployment loads are transferred through the mounting device to the seat frame 24.

The seat back cover 40 includes a back panel 42 and a pair of side panels 44. The side panels 44 include outwardly facing surfaces that face toward opposite sides of the vehicle seat. The back panel 42 includes a surface facing rearward away from the occupant of the seat. The seat back cover 40 is formed to wrap around the seat back 22. The seat back cover 40 is configured to be received in a cavity or socket 46 in the seat back 22 formed by the cushion 25 such that, when the seat back cover 40 is coupled to the seat frame 24, the back cover 40 forms a relatively smooth, continuous contour with the seat foam 25. An optional cavity or socket 46 is shown in the right side of the seat in FIG. 2, but the cavity 46 for the SAB module is located on the outboard or left side of the vehicle seat. The seat back cover 40 is formed of a material which is relatively rugged, such that the back cover 40 is able to withstand daily impact and wear (e.g., from a passenger or object located behind the vehicle seat 12), but is flexible enough to allow the side panel 44 to flex outward when the SAB module 30 is deployed. According to an exemplary embodiment, the seat back cover 40 is molded from a polymer material with suitable physical properties. The back cover 40 may be molded in a color to match or compliment the color of the vehicle seat cover (e.g., a leather or fabric cover). The back cover 40 may be molded to have a variety of surface finishes or patterns.

The SAB module 30 is positioned along an inner surface of the seat back cover 44 of the seat back cover 40. According to an exemplary embodiment, the SAB module 30 is coupled to the back cover 40 with a bracket 50. The SAB module 30, including the inflator 31 and airbag 30, is connected to the bracket 50 which may be coupled to the side panel 44 of the seat back cover 40. In one embodiment, the bracket 50 is integrally formed with the back cover 40 (e.g., insert molded). In other embodiments, the bracket 50 may be a separate body that is otherwise coupled to the seat back cover 40 (e.g., welded, fastened with a bolted connection, riveted, etc.). The SAB module 30 is coupled to the bracket 50, such as with fasteners 52. The bracket 50 may include openings 51 for receiving the fasteners 38 which attach the SAB module 30 to the seat frame 24. The openings 51 may be positioned on tabs or flanges extending from the portion of the bracket 50 securing the inflator 31 and the folded airbag 32.

The SAB module 30 is coupled to the seat frame 24 with a mounting device (e.g., fasteners, bracket, etc.). According to one exemplary embodiment, the SAB module 30 is coupled to the back side of the seat back frame 24 with a pair of threaded fasteners 38. The fasteners 38 pass through openings 51 in the mounting bracket 50 and the seat back cover 40 and engage the seat back frame 24 such that the SAB module 30 and the seat back cover 40 are coupled to the frame 24 with the SAB module 30 concealed under the back cover 40. According to an exemplary embodiment, the fasteners 38 may not directly engage the seat back cover 40. Instead, the fasteners 38 pass through access openings 41 in the back cover 40 to engage the bracket 50, which is separately coupled to the seat back cover 40, as described above. As shown in FIG. 6, trim pieces, such as caps 39, may be coupled to the access openings 41 in the seat back cover 40 to cover the fasteners 38. In other embodiments, the fasteners 38 may directly engage the back cover 40.

In a side impact, the inflator inflates the airbag cushion 32. As the airbag cushion 32 inflates, it is driven away from the vehicle seat 12, pushing the side panel 44 of the back cover 40 outward. The outward movement of the side panel 44 allows the airbag cushion 32 to emerge from between the side panel 44 of the back cover 40 and a side surface 54 of the seat cushion 25 to be positioned along the side of the occupant 14 of the vehicle seat 12. The side panel 44 flexes outwardly due to the force of the expanding airbag cushion 32. The side panel 44 may function to guide the deploying airbag into a proper position outboard the vehicle occupant. Thus, the side panel 44 may function as a deployment chute along side of which the airbag deploys into proper position.

Because the airbag cushion 32 emerges from the side of the seat 12, between the back cover 40 and the cushion 25 instead of through a seam in the cover, the front facing surface of the cushion 25 and the side and rear facing surfaces of the cover 40 do not need to be styled and/or contoured to accommodate the SAB 30, but may instead be styled generally independent of the SAB module 30 as long as there a cavity for mounting the SAB. The seat back cover 40 may attach to the other portions of the vehicle seat in a conventional manner for vehicle trim such as, for example, snap fit or eye and hook configuration.

Additionally, the SAB module 30 and seat back cover 40 can be adapted to be installed on various vehicle seat designs with various frames and with minimal impact on the design of the seat cushion 25. The SAB module 30 and the seat back cover 40 can be easily installed using only a few fasteners. The SAB module 30 can be mounted at an angle relative to the seat frame 24, improving packaging and allowing for the overall seat width of the seat 12 to be reduced.

The SAB module 30 and seat back cover 40 may provide a reduction in parts and assembly complexity compared to traditional SAB systems including deployment chutes or other mechanisms to facilitate the deployment of the cushion though a seam in the seat cover. The deployment of the SAB cushion 32 through the boundary between the back cover 40 and the cushion 25 may allow for an improved deployment consistency over systems in which the SAB cushion deploys through a seam in the cover.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It is important to note that the construction and arrangement of the airbag module as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A side airbag assembly for protecting an occupant of a vehicle seat, comprising:
   a seat back cover including a rear panel and a first side panel, the seat back cover configured to overlie a back surface of the vehicle seat;
   a side airbag module including an inflatable cushion and an inflator for providing inflation gas for inflating the cushion; and a mounting bracket connected to the side airbag module, the mounting bracket and the side airbag module being connected to an inner surface of the first side panel, wherein when the seat back cover overlies the back surface of the vehicle seat, the mounting bracket is configured to be connected to a back frame of the vehicle seat and the first side panel flexes outwardly when the inflatable cushion inflates; and wherein the rear panel of the seat back cover includes at least one opening to facilitate connecting the mounting bracket to the back frame of the vehicle seat via a first fastener that does not directly engage the seat back cover.

2. The assembly of claim 1, wherein the mounting bracket is integrally formed with the seat back cover.

3. The assembly of claim 1, wherein the seat back cover includes a second side panel that faces in an opposite direction to the first side panel.

4. The assembly of claim 1, wherein the seat back cover is configured so that the first side panel flexes outwardly along an area formed where the rear panel and first side panel meet.

5. The assembly of claim 1, wherein the mounting bracket includes a first opening for receiving the first fastener for connecting the mounting bracket to the back frame of the vehicle seat.

6. The assembly of claim 5, wherein the mounting bracket includes a second opening for receiving a second fastener for connecting the mounting bracket to the seat back cover.

7. The assembly of claim 6, wherein the openings are positioned in the mounting bracket so that the first fastener extends in a direction substantially perpendicular to a direction that the second fastener extends.

8. A side airbag assembly for protecting an occupant of a vehicle seat, comprising:

a seat back cover including a rear panel and a first side panel, the seat back cover configured to overlie a back surface of the vehicle seat;

an inflatable cushion stored in a compact arrangement; and an inflator for providing inflation gas for inflating the cushion, the inflator and cushion being arranged so that the inflation gas provided by the inflator enters the cushion and being secured in position by a mounting bracket connected to an inner surface of the first side panel, wherein when the seat back cover overlies the back surface of the vehicle seat the mounting bracket is configured to be connected to a back frame of the vehicle seat and the first side panel flexes outwardly when the inflatable cushion inflates; and wherein the rear panel of the seat back cover includes at least one opening to facilitate connecting the mounting bracket to the back frame of the vehicle seat via a first fastener that does not directly engage the seat back cover.

9. The assembly of claim 8, wherein the mounting bracket is integrally connected to the seat back cover.

10. The assembly of claim 8, wherein the cover includes a second side panel that faces in an opposite direction to the first side panel.

11. The assembly of claim 8, wherein the seat back cover is configured so that the first side panel flexes outwardly along an area formed where the rear panel and the first side panel meet.

12. The assembly of claim 8, wherein the mounting bracket includes a first opening configured to receive the first fastener for connecting the mounting bracket to the back frame of the vehicle seat.

13. The assembly of claim 12, wherein the first opening is aligned with the at least one opening in the seat back cover.

14. The assembly of claim 13, wherein mounting bracket includes a second opening for receiving a second fastener for connecting the mounting bracket to the first side panel.

* * * * *